United States Patent

Allard

[15] 3,665,685
[45] May 30, 1972

[54] MOWING DEVICE FOR CUTTING VEGETATION ADJACENT A FENCE

[72] Inventor: Jean Allard, 2690 Desaulniers, St-Hyacinthe, Quebec, Canada

[22] Filed: July 6, 1970

[21] Appl. No.: 52,278

[52] U.S. Cl. .................................56/10.4, 56/11.9, 56/15.5, 56/15.8
[51] Int. Cl. .........................................................A01d 35/26
[58] Field of Search..................56/6, 10.4, 11.9, 13.6, 15.5, 56/15.7, 15.8, 17.2, 320.1

[56] References Cited

UNITED STATES PATENTS

| | | | |
|---|---|---|---|
| 3,498,036 | 3/1970 | Cowling et al. | 56/320.1 X |
| 3,103,090 | 9/1963 | Campbell | 56/13.6 X |
| 2,992,524 | 7/1961 | Stabnav | 56/320.1 |
| 2,732,675 | 1/1956 | Smith et al. | 56/13.6 X |
| 3,261,150 | 7/1966 | Fitzgerald, Sr. | 56/13.6 UX |
| 3,115,739 | 12/1963 | Thoen et al. | 56/10.4 |
| 3,045,413 | 7/1962 | Sheffer | 56/10.4 UX |
| 3,397,521 | 8/1968 | Danuser | 56/13.6 X |

Primary Examiner—Louis G. Mancene
Assistant Examiner—J. A. Oliff
Attorney—Raymond A. Robic

[57] ABSTRACT

A device for cutting vegetation on both sides of a fence, comprising, a chassis adapted to be pivotally mounted behind a tractor so as to be pulled in various angular positions relative to the tractor, a frame having a reverse U-shape including a base and two pending legs, the said base being pivotally connected to the chassis about a substantially vertical axis, two L-shaped members having a vertical arm and a horizontal arm, each vertical arm is pivotally connected to each leg of the frame about a vertical axis, two lawn-mowers for cutting vegetation, each lawn-mower is rigidly secured at the end of each of the said horizontal arms, connection between said two members for biassing the two lawn-mowers towards each other, and a holder for resiliently restraining the movement of each mower relative to the frame.

21 Claims, 13 Drawing Figures

Patented May 30, 1972

INVENTOR
Jean ALLARD

ATTORNEY

INVENTOR
Jean ALLARD

ATTORNEY

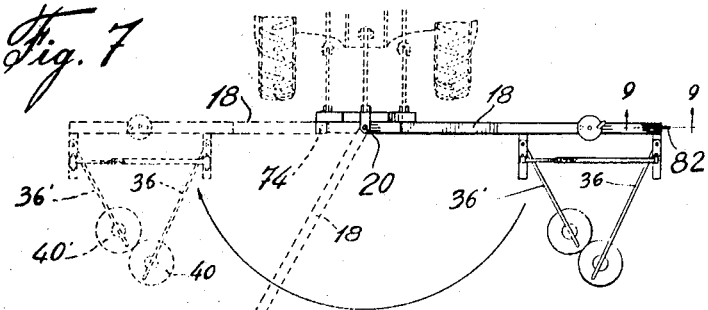
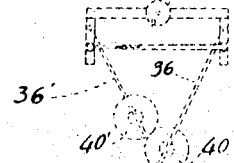
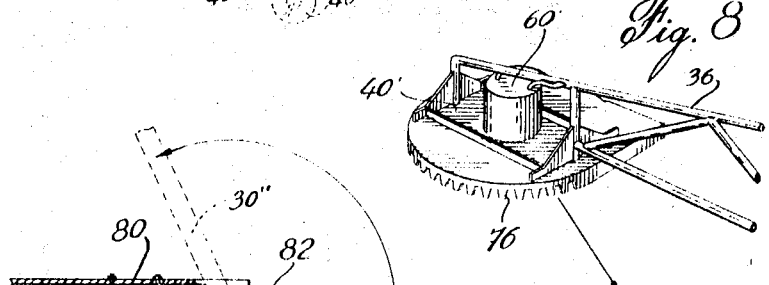
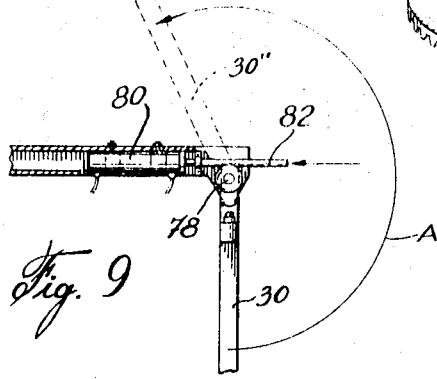
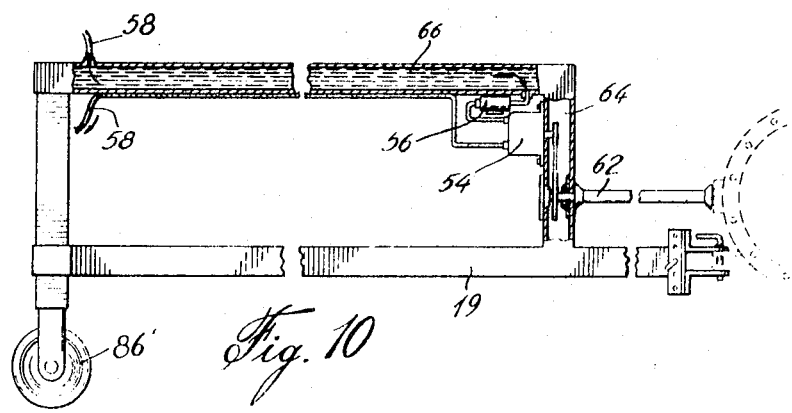
INVENTOR
Jean ALLARD
ATTORNEY

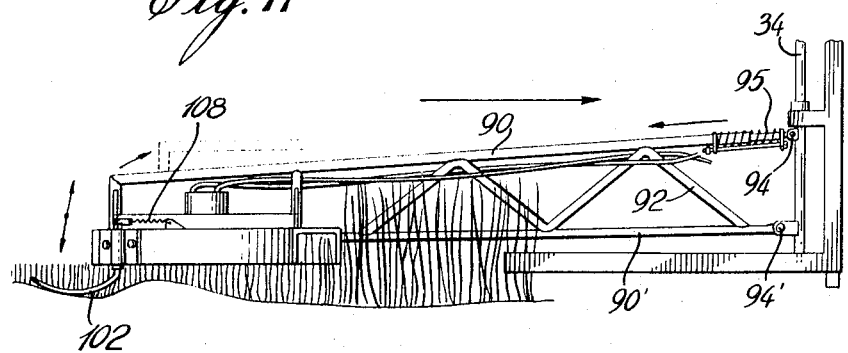
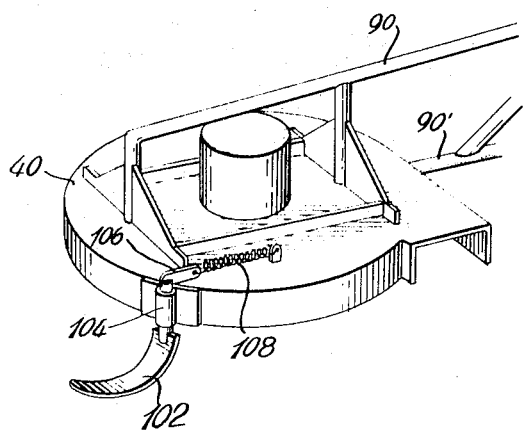
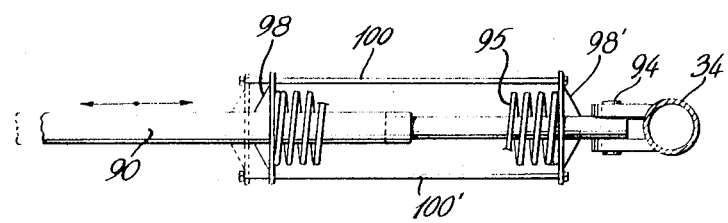
INVENTOR
Jean ALLARD
BY
ATTORNEY

MOWING DEVICE FOR CUTTING VEGETATION ADJACENT A FENCE

The present invention relates to a device for mowing vegetation on both sides and underneath a fence which is raised from the ground and held by spaced posts.

The known mowing devices for cutting vegetation along fences and on both sides thereof generally comprise a heavy equipment which is not very versatile.

The present device is designed to cleanly cut the vegetation on both sides of a fence and around the holding posts. It further enables to vary the distance between the cutting line and the moving line of the tractor. It also prevents any undesired overlapping of the two lawn-mowers used in the device over the cutting line so as not to reduce the width of the band of vegetation which is cut. It permits the automatic spacing of the two lawn-mowers. The new mowing device also enables to remove the outer lawn-mower from the cutting path when obstacles are met. It is furthermore possible to use the new device on inclined ground.

A more complete understanding of the invention is provided in the following detailed description taken in connection with the accompanying drawings, in which.

Figure 1:
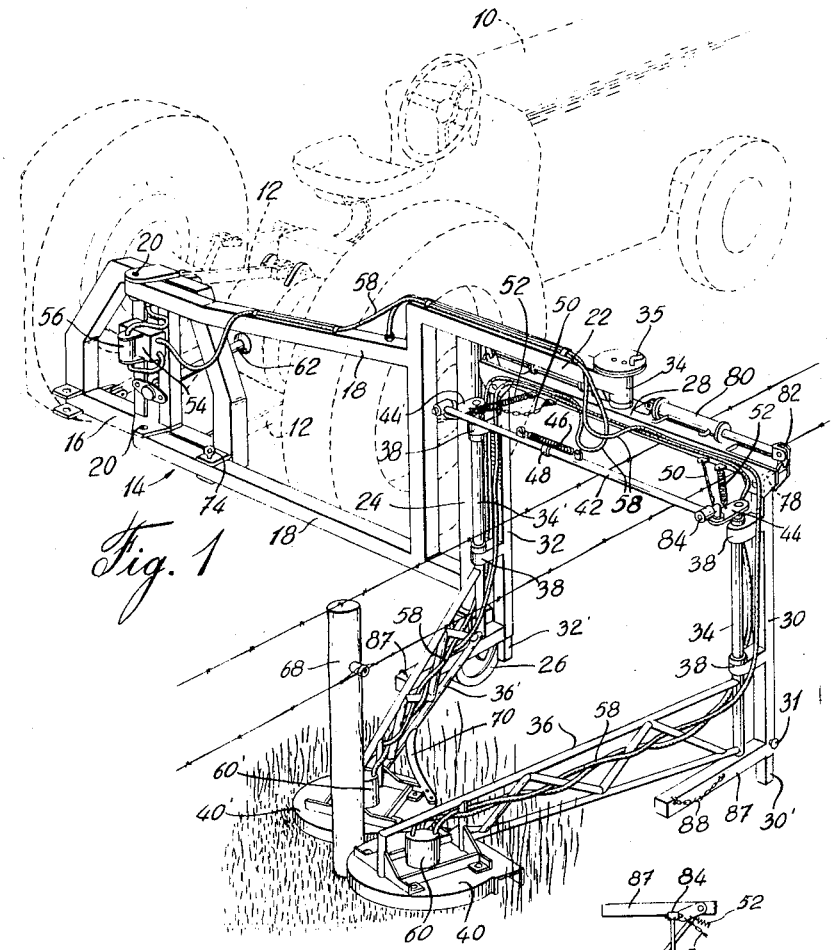
FIG. 1 is a perspective view of an embodiment of the invention.
Figure 3:
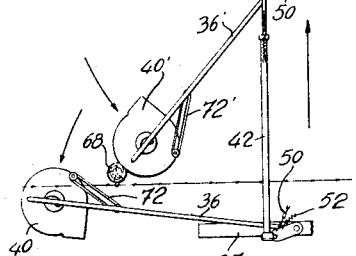
Figure 4:
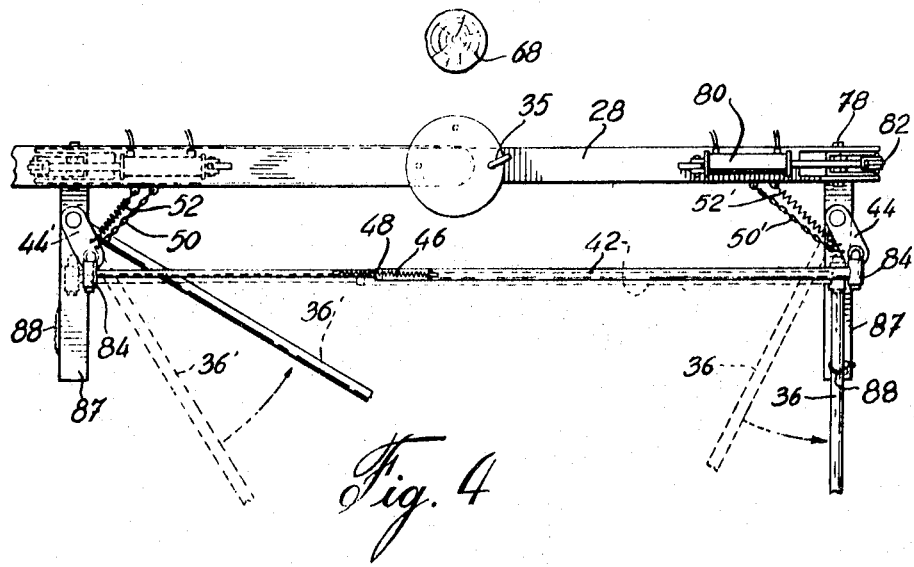
Figure 5:
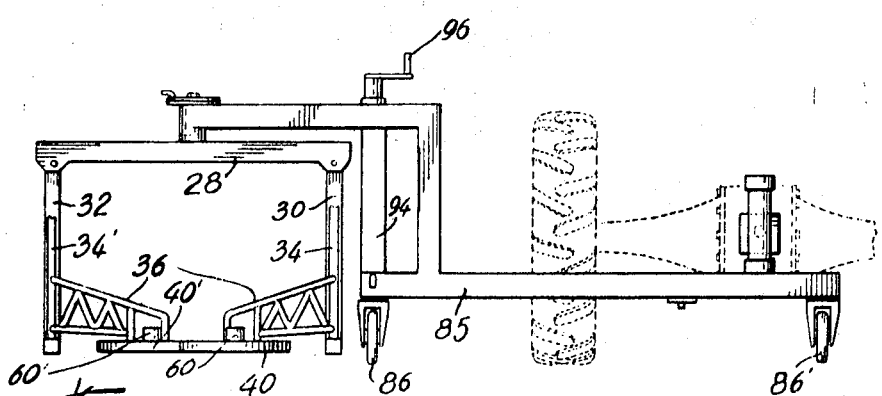
Figure 6:
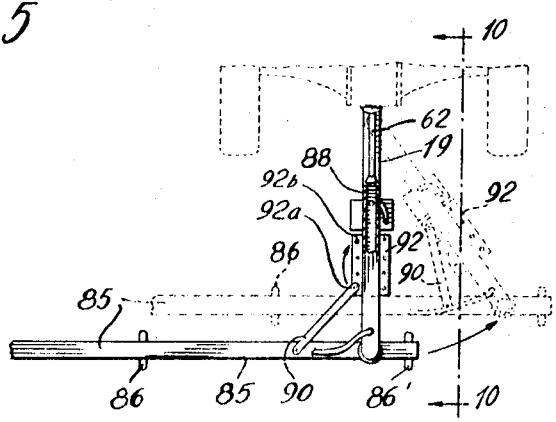

FIG. 4, is an enlarged and partial view of FIG. 3 showing the displacement of the supporting arms of the lawn-mowers, FIG. 5 is a rear view of another embodiment of the invention, FIG. 6 is an upper partial view of the embodiment illustrated in FIG. 5 showing a lateral displacement of the lawn-mowers, FIG. 7 is a top view of the device shown in FIG. 1 illustrating the angular displacement of the device behind a tractor, FIG. 8 is a perspective view of a lawn-mower having a toothed skirt, FIG. 9 is a sectional view taken along line 9—9 of FIG. 7, FIG. 10 is a view taken along line 10—10 of FIG. 6 showing the broken hydraulic reservoir, FIG. 11 is a side view of the horizontal arm and a lawn-mower according to another embodiment of the device, FIG. 12 is an enlarged view of the resilient connection of the horizontal arm shown in FIG. 11, and FIG. 13 is a perspective view of a lawn-mower having a supporting curved leaf at its periphery.

FIG. 1 shows, in dotted lines, a tractor 10 to which is fixed a mowing device for cutting vegetation by three connecting bars 12. The mowing device comprises a structure 14 which includes a rigid frame 16 solidly secured to the tractor by the bars 12 and on which pivots the chassis 18 around the axles 20. The chassis 18 extends at its upper part by a projection 22 and a vertical projection 24 held at its bottom by a wheel 26.

A frame having the shape of a reversed U comprises a base 28 and two legs 30 and 32 connected to the horizontal projection 22 by a neck 34 so as to enable the frame to pivot about a vertical axis. The peg 35 stops the rotation of the U-shaped frame relative to the chassis 18.

A L-shaped member is connected to each leg 30 and 32. These members comprise vertical arms 34 and 34' and horizontal arms 36 and 36', the vertical arms being connected to the legs 32 and 34 by hinge means 38 so as to enable a horizontal displacement of the lawn-mowers 40 and 40' which are solidly secured at the free end of the horizontal arms 36 and 36'.

In order to urge the two lawn-mowers towards each other, a sliding bar 42 is connected to two levers 44 and 44', the latter being fixed at the top of the vertical arms 34 and 34'. The sliding bar is made of two coaxial cubes whose sliding movement is resiliently limited by the spring 46 and by a stop 48 so that the length of the sliding bar 42 may not be shortened beyond a minimum length. The spring 46 will permit a resilient lateral movement for the lawn-mowers 40 and 40' while the overlapping will be limited by the stop 48.

In addition, each lawn-mower is prevented from pivoting beyond an outer predetermined position by a chain 50 and a spring 52 connecting the levers 44 and 44' to the base 28 of the frame. The spring 52 slows down the movement and the chains provide a stop for the latter. Although a combination of chains 50 and 50' and springs 52 and 52' are illustrated to clearly represent the desired functions, this combination may advantageously be replaced by a hydraulic or pneumatic shock absorber of a known type.

The lawn-mowers 40 and 40' are provided with one or two rotating blades actuated by a hydraulic circuit. The circuit is constituted by a pump 54 and a filter 56 which circulate a liquid in the tubing 58 towards the motors 60 and 60' so as to actuate the latter. The two motors 60 and 60' are preferably arranged in series in the circuit. The pump 54 is actuated by a rod 62 connected to the tractor. The rotating speed of the rod 62 is reduced by a gear box 64 (FIG. 10). A part of the chassis 18 is used as a reservoir 66 for the fluid of the circuit. The open section in FIG. 10 shows the reservoir 66.

Figure 2:
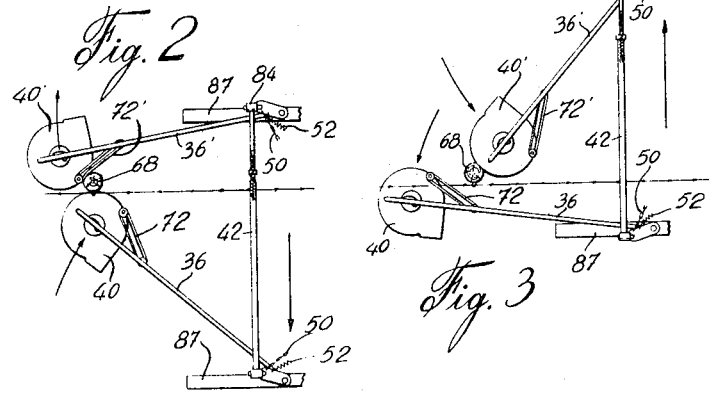
FIGS. 2 and 3 are schematic views of two relative positions of the lawn-mowers.

FIGS. 2 and 3 show that the new device can mow the vegetation adjacent the fence whether the latter is aligned with the left or the right side of the U-shaped frame. Accordingly, the tractor will be able to follow a path with a certain deviation from a linear direction while the lawn-mowers will be able to follow the direction of the fence on account of the pivoting of the arms 36 and 36'.

In the position illustrated in FIG. 2, the lawn-mower 40, when reaching the post 68, is the first one to be spaced from the cutting line. While the second lawn-mower 40' reaches the post and is spaced from the cutting line, the first one comes back to its original position after having followed the contour of the post. The second lawn-mower 40' then follows the same operation. With this arrangement, the vegetation around the post 68 is substantially completely cut. The same operation takes place for the arrangement illustrated in FIG. 3 except that the steps are reversed, that is, the lawn-mower 40' precedes the lawn-mower 40.

In order to prevent the post 68 to wedge in between the lawn-mower and its respective horizontal supporting arm, a band 70 (FIG. 1) or a free rotating belt 72 and 72' (FIGS. 2-3) are installed to close the corner formed by the lawn-mower and its horizontal support.

FIG. 4 shows, on an enlarged scale, the pivoting action of the horizontal supporting arms 36 and 36' and the lateral movements of the sliding bar 42, according to the relative position of the cutting line formed by the fence and the posts 68. The chains 50 and 50' limit the outwardly angular displacement of the arms 36 and 36' so as to present the spacing of the two lawn-mowers 40 and 40' and therefore to present a band of vegetation to remain not mowed. In the other intermediate positions of the lawn-mowers, the springs 52 and 52' as well as 46 urge the lawn-mowers towards each other. The stops 48 limits to a minimum length, the sliding rod 42 and therefore prevents an overlapping of the two lawn-mowers over the cutting line, particularly when the latter are alternatively spaced by a post (see FIGS. 2–3).

FIG. 7 shows that the present device enables in an easy and rapid manner, a lateral displacement of the lawn-mowers from one side to the other of the traveling line of the tractor. This is accomplished by pivoting the device around the axle 20 and by locking its working position by a peg 74.

When the vegetation is long, it is preferably to provide the forward part of the skirt of the lawn-mower with a toothed contour 76 (FIG. 8). Such a contour enables the vegetation to enter the lawn-mower without being laid down so that the rotation blade may more easily cut the vegetation.

It may be expected that when the mowing device is pulled, the outer leg 30 and 32 according to the orientation of the chassis meets obstacles. Instead of lateral circling these obstacles, it is sometimes preferable to raise the leg 30 or 32 out of the way of the obstacles. The present device foresees such a desired result by pivoting the legs 30 and 32 about the ends of the base 28. FIG. 1 shows the leg 30 suspended about a pivoting axle 78 and adapted to be pivotally raised by the traction of the hydraulic cylinder 80 connected to the lever 82. As an alternative, FIG. 9 shows a section along line 9—9 of FIG. 7. The leg 30 pivots about the axle 78 by the action of the cylinder 80 located in the base 28. The piston of the cylinder 80 actuates a toothed rack 82 which drives in rotation a toothed wheel solidly secured to the upper end of the leg 30. If the axle 78 is coaxially aligned with the sleeve 84 which holds the sliding bar 42, the latter will not have to be dismounted from the lever 44 nor from the chain 50 and the spring 52 when the leg 30 will pivot upwardly in its upper position 30" (FIG. 9) that is, in the direction of the arrow A.

When the leg 30 is raised, the arm 36 is attached to the stump 87 with a chain 88 is illustrated on the right-hand side of FIG. 4.

The circulation of the liquid in the hydraulic circuit is illustrated in part in FIG. 10. The reservoir 66 is located in the chassis 19. The circulation is obtained by a pump 54 actuated by the transmission bar 62 connected to the tractor by a gear box 64 which comprises speed reducing gears or belts.

A filter 56 is located in the system to eliminate unwanted foreign particles and to maintain the desired fluidity of the liquid. The tubing 58 extends from the reservoir 66, goes through the two lawn-mowers in series and comes back to the same reservoir.

FIGS. 5 and 6 display another embodiment of the device in which the chassis 85 is supported by two wheels 86 and 86' and is held to the tractor by a connecting element 88 adapted to pivot at both ends. The angle of the connecting element 88 relative to the chassis is determined by a rod 90 fixed in diagonal therebetween. The illustration in full lines in FIG. 6 shows a chassis 85 at right angle with the element 88. If the operator desired to displace the cutting line towards the right (FIG. 6) by displacing the whole chassis, it may be obtained by closing the angle between the element 88 and the chassis 85 such as shown in dotted lines in FIG. 6. This is obtained by displacing the end of the rod 90 on the plate 92 from the point 92a to the point 92b.

The chassis 85 is supported by the wheels 86 and 86' which are generally at the same level. However, if the mowing device moves along a sloping ground, the wheel 86 which is located at the lower end of an upright member 94 is vertically displaced by a handle 96. This will enable the two lawn-mowers to move in a plane parallel to the one wheel on the ground.

While the two motors 60 and 60' were previously indicated as being connected in series, they may also be mounted in separate circuits and the two circuits connected by an equalizing valve.

When the device is stored or simply set aside for a period of time, telescopic legs 30' and 32' are foreseen to extend below the legs 30 and 32. This is accomplished by loosening the tightening screws 31. These extended legs enable to provide an adequate support over three points for the U-shaped frame, the lawn-mowers forming the third point.

FIG. 11 shows a modified embodiment for the suspension of the horizontal arm supporting the lawn-mower. The horizontal arm is formed by two beams 90 and 90' interconnected by a brace 92. Each beam is pivotally connected to the vertical arm 34 respectively about the axles 94 and 94'. The upper beam 90 has a variable length because it is made of two coaxial sliding beams. A coil spring 95 is mounted over the junction of the two coaxial beams and is compressed thereover by two plates 98 and 98' solidly secured to each of the two coaxial beams of the beam 90. The length of the coil spring 95 is limited by a pair of rods 100 and 100' connected to each plates 98 and 98'. The rods 100 and 100' are slidingly mounted through the plate 98 so as to permit the coil spring 95 to become pressed by the plate 98 when the beam 90 is raised due to the lawn-mower which moves over a raised part of the ground. This arrangement enables the lawn-mower to remain in contact with the ground while being free to move upwardly when the ground raises relative to the level of the vertical arm 34.

FIG. 13 illustrates a curved leaf 102 which is pivotally fixed at the periphery of the lawn-mower 40 about a vertical axle 104. The orientation of the curved leaf 102 is urged in a predetermined angular position by a spring 108 which pulls on a lever 106 connected to the vertical axle 104.

The curved leaf is set at a level so as to cut the vegetation of a predetermined height and particularly so as to prevent the rotating blade of the lawn-mower to hit the ground. The fact that the curved leaf 102 is pivotally mounted permits the latter to hit obstacles while maintaining its function to keep the lawn-mower above the ground.

I claim:

1. A mowing device for cutting vegetation on both sides of a fence, comprising:
    a chassis adapted to be pivotally mounted behind a tractor so as to be pulled in various parallel directions relative to the intended direction of travel of the tractor,
    a frame having an invented U-shape including a base and two pending legs, the said base being pivotally connected to the chassis about a substantially vertical axis,
    two L-shaped members having a vertically extending arm and a horizontally extending arm, each vertical arm is pivotally connected to each leg of the frame about a vertical axis,
    two moving means for cutting vegetation, each mowing means rigidly secured at the end of each of the said horizontally extending arms,
    connecting means between the vertically extending arm of said two members for resiliently biassing the two mowing means towards each other, the said connecting means comprising stop means for preventing overlapping of said mowing means when the latter are at different levels,
    holding means mounted between the frame and each end of the said connecting means for resiliently restraining independently the movement of each mowing means relative to the chassis.

2. A device as recited in claim 1, wherein the connecting means comprise a stop for limiting the movement of the two mowing means towards each other.

3. A device as recited in claim 1, wherein each of the two mowing means comprise a rotating blade lawn-mower.

4. A device as recited in claim 3, wherein the lawn-mower is actuated by hydraulic means.

5. A device as recited in claim 3, comprising deflecting means extending between each lawn-mower and the corresponding horizontally extending arm of the said members for preventing the wedging of the fence posts therebetween.

6. A device as recited in claim 5, wherein the deflecting means comprise a freely rotating belt.

7. A device as recited in claim 1, comprising means for pivotally raising the most distant leg from the tractor outwardly of the said U-shape towards the upper part of the frame.

8. A device as recited in claim 7, wherein the raising means comprise a hydraulic piston connected between the said base and each leg of the frame.

9. A device as recited in claim 1, wherein the holding means comprise a spring and a chain mounted parallel thereto between the said frame and each vertically extending arm.

10. A device as recited in claim 1, wherein the holding means comprise a fluid piston mounted between the frame and each vertically extending arm for absorbing the shocks on the two mowing means.

11. A device as recited in claim 1, wherein the chassis is pivotally connected to the tractor and adapted to be immobilized at both ends of its pivoting movement.

12. A device as recited in claim 1, wherein the connecting means between the said two members comprise a lever perpendicularly fixed to each vertically extending arm, a longitudinally adjustable rod fixed to each of said levers, a stop for limiting the adjustment of said rod to a minimum length, and a spring for urging said rod towards its minimum length.

13. A device as recited in claim 3, comprising a hydraulic pump actuated by the tractor, a hydraulic motor for actuating each lawn-mower and a hydraulic circuit for connecting in series the pump and the two said motors.

14. A device as recited in claim 13, wherein at least a part of said chassis constitutes a reservoir for the hydraulic circuit.

15. A device as recited in claim 1, comprising a pivoting member between the tractor and the chassis, and means for angularly adjusting the said pivoting member relative to the chassis.

16. A device as recited in claim 1, wherein the said chassis comprises at least a wheel for supporting the outer end of the chassis on the ground.

17. A device as recited in claim 1, wherein the said chassis has two supporting wheels, at least one of the wheels is vertically adjustable.

18. A device as recited in claim 3, wherein the lawn-mowers have a toothed skirt to facilitate the vegetation to remain in a more erect position when mowed.

19. A device as recited in claim 3, wherein the vertically extending arm and the horizontally extending arm of the said members are pivotally connected to each other.

20. A device as recited in claim 19, wherein the horizontally extending arm comprises means for being resiliently urged towards the ground.

21. A device as recited in claim 20, wherein the lawn-mowers are each provided with a skirt, a curved leaf fixed to said skirt and adapted to contact the ground for preventing the lawn-mower from touching the ground, and means for resiliently urging said leaf in a predetermined angular position about a vertical axis.

* * * * *